United States Patent
Rosales et al.

(10) Patent No.: US 12,204,113 B1
(45) Date of Patent: Jan. 21, 2025

(54) HEAD-MOUNTED DISPLAY DEVICE INCORPORATING PIEZO-ELECTRIC DEVICE FOR HEAT DISSIPATION, AND RELATED METHODS

(71) Applicant: QUALCOMM Incorporated, San Diego, CA (US)

(72) Inventors: Jorge Luis Rosales, San Diego, CA (US); Le Gao, San Diego, CA (US); Peng Wang, San Diego, CA (US); Kenneth Baar, Rancho Santa Fe, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/465,792

(22) Filed: Sep. 12, 2023

(51) Int. Cl.
*G02B 27/01* (2006.01)
*G02C 11/00* (2006.01)
*G06F 1/16* (2006.01)
*G06F 1/20* (2006.01)

(52) U.S. Cl.
CPC .......... *G02B 27/0176* (2013.01); *G02C 11/10* (2013.01); *G06F 1/163* (2013.01); *G06F 1/203* (2013.01); *G02B 2027/0163* (2013.01); *G02B 2027/0178* (2013.01)

(58) Field of Classification Search
CPC ........ G02B 27/0176; G02B 2027/0163; G02B 2027/0178; G02C 11/10; G06F 1/163; G06F 1/203
See application file for complete search history.

(56) References Cited

U.S. PATENT DOCUMENTS

| | | | |
|---|---|---|---|
| 7,690,214 B2* | 4/2010 | Lu | G06F 1/203 62/64 |
| 10,036,889 B2* | 7/2018 | Border | G02B 27/0172 |
| 10,514,542 B2* | 12/2019 | Erinjippurath | G02B 27/0172 |
| 10,712,791 B1* | 7/2020 | Stanley | G06F 1/206 |
| 10,746,474 B2* | 8/2020 | Rosales | F28D 15/025 |
| 11,058,026 B1* | 7/2021 | Marić | G06F 3/011 |
| 11,696,421 B1* | 7/2023 | Ganti | F04B 39/06 165/80.2 |

(Continued)

*Primary Examiner* — Vinh T Lam
(74) *Attorney, Agent, or Firm* — Withrow & Terranova, PLLC

(57) ABSTRACT

Head-mounted electronic device incorporating a piezo-electric device for dissipation of heat, and related methods of controlling the piezo-electric device to dissipate heat from the head-mounted electronic device are disclosed. To dissipate heat in the head-mounted electronic device, the piezo-electric device is integrated in the head-mounted electronic device and is fluidly coupled to an internal air chamber in the head-mounted electronic device that in fluid communication with an integrated circuit (IC). The piezo-electric device draws the heated air around the IC into the internal chamber that heats air inside the internal chamber. The piezo-electric device is configured to pump heated air in the internal chamber through an outlet to dissipate the heated air from the internal chamber. Dissipation of heated air heated from heat generated from the IC can keep the IC from exceeding its thermal limits and/or prevent the head-mounted electronic device from exceeding its skin temperature limit.

27 Claims, 12 Drawing Sheets

(56) References Cited

U.S. PATENT DOCUMENTS

| | | | | |
|---|---|---|---|---|
| 11,744,038 | B2* | 8/2023 | Sathyamurthy | H01L 23/467 |
| | | | | 165/80.2 |
| 11,758,702 | B2* | 9/2023 | Maric et al. | G10K 11/1752 |
| | | | | 345/905 |
| 11,765,863 | B2* | 9/2023 | Yalamarthy | H05K 7/2039 |
| | | | | 361/710 |
| 11,785,739 | B2* | 10/2023 | Sankar | H05K 7/20172 |
| | | | | 165/80.3 |
| 11,796,262 | B2* | 10/2023 | Mukundan | H05K 7/2049 |
| 11,943,377 | B2* | 3/2024 | Sathyamurthy | G06F 1/203 |
| 12,029,005 | B2* | 7/2024 | Ganti | G06F 1/203 |
| 2004/0244405 | A1* | 12/2004 | Kim | G06F 1/203 |
| | | | | 257/E23.088 |
| 2019/0257589 | A1* | 8/2019 | Rosales | H05K 7/20336 |
| 2021/0185856 | A1* | 6/2021 | Ganti | G06F 1/203 |
| 2022/0007538 | A1* | 1/2022 | Mou | G02B 27/0179 |
| 2022/0110220 | A1* | 4/2022 | Yalamarthy | F04D 29/582 |
| 2023/0269903 | A1* | 8/2023 | Qiu | G01K 3/005 |
| | | | | 361/688 |
| 2023/0363123 | A1* | 11/2023 | Maric | H04N 23/57 |

\* cited by examiner

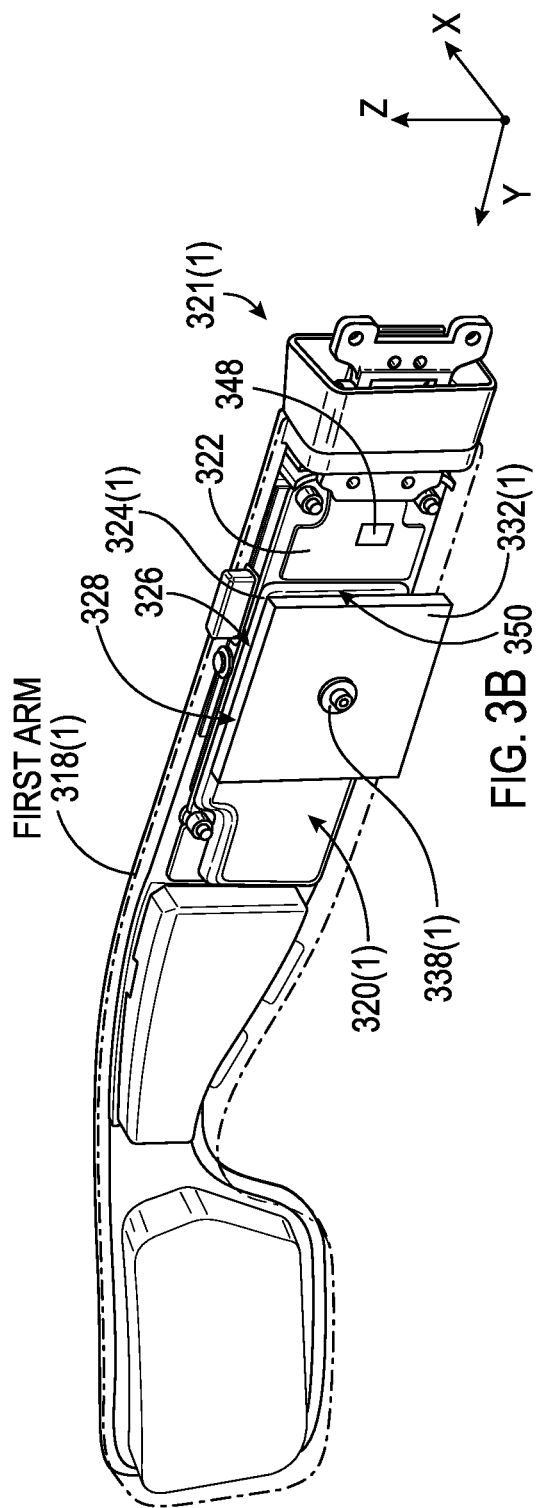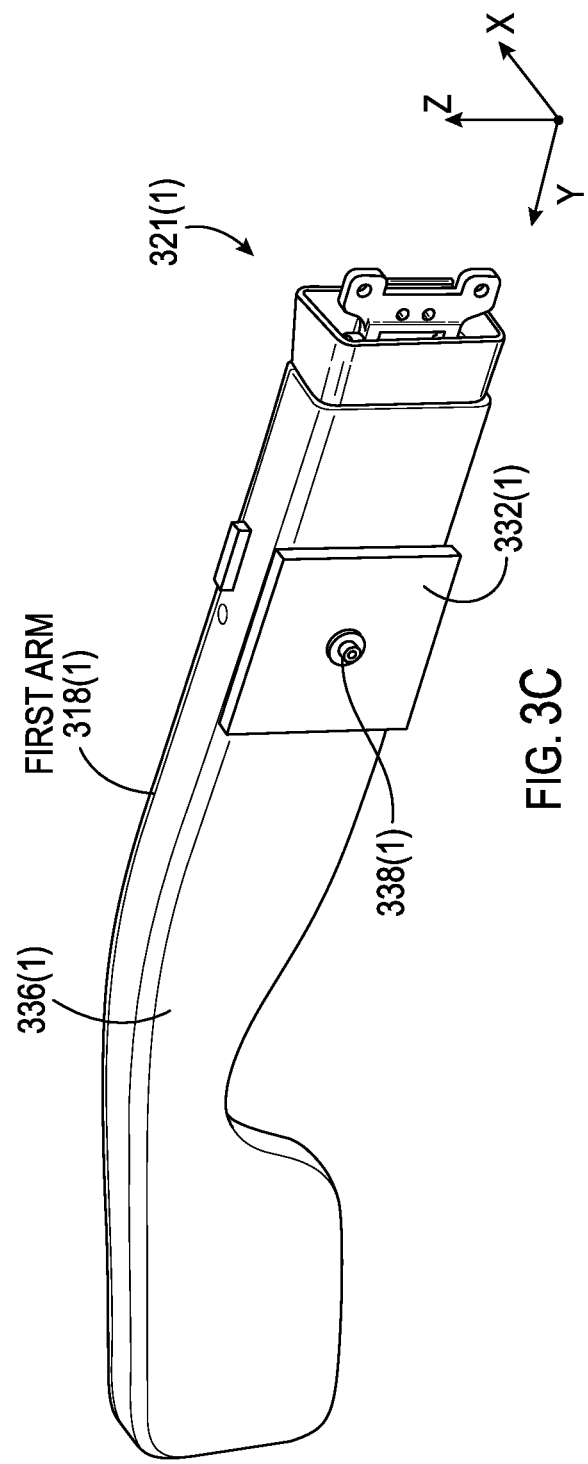

HEAD-MOUNTED DISPLAY DEVICE INCORPORATING PIEZO-ELECTRIC DEVICE FOR HEAT DISSIPATION, AND RELATED METHODS

BACKGROUND

I. Field of the Disclosure

The field of the disclosure relates to wearable electronic devices that include computational devices, such as head-mounted display devices, including virtual reality (VR), augmented reality (AR), and extended reality (XR) head-mounted display devices.

II. Background

Power consumption in computational electronic devices is a function of the voltage and the frequency that circuits are clocked according to the formula Power=Capacitance X Voltage $(V)^2$ X frequency (f). A higher operating voltage (V) can result in faster signal propagation in circuits. A higher operating frequency (V) can result in faster computation and processing of signals. Thus, in order to achieve higher computational performance levels in computational electronic devices, operating voltage (V) and/or operating frequency (f) can be increased up to a voltage rail and/or frequency limit of the circuits in the devices. However, increasing operating voltage (V) and/or operating frequency (f) increases power consumption that can cause additional heat generation as a result of energy losses from the powered operation of circuits. Electronic devices have a thermal limit that can be based on reliability, performance, and/or safety of the device. For example, an electronic device may have a thermal limit at which performance starts to degrade or circuits in the device are no longer able to reliably operate. An electronic device may also have a skin temperature limit as a maximum temperature permitted to come into contact with an external environment or a user's skin. Thus, computational electronic devices are increasingly being required to be designed to dissipate increased amounts of heat to prevent the electronic device from exceeding thermal and/or skin temperature limits.

One type of computational electronic device that may have both thermal and skin temperature limits is a wearable computational electronic device, such as computing devices that may be used for extended reality applications, including virtual reality (VR), augmented reality (AR), and extended reality (XR) applications. For example, reality computing devices can display an imaged real world object on a screen along with computer generated information, such as an image or textual information. One example of a reality mobile computing device is a head-mounted electronic device in the form of head-mounted XR glasses, such as the electronic glasses 100 shown FIG. 1. The electronic glasses 100 are an electronic computing device that includes a computing device 102 that controls an integrated display 104 that is integrated into the lenses 106. The integrated display 104 allows the user to see either VR images and/or real world with objects added by the computing device 102. The computing device 102 as well as the integrated display 104 and other supporting circuitry included in the electronic glasses 100 must be powered for operation. Thus, the computing device 102 as well as the integrated display 104 and other supporting circuitry included in the electronic glasses 100 will dissipate energy losses in the form of heat. The computing device 102 has a thermal limit for operation. Also, because the electronic glasses 100 are worn by a user, the electronic glasses 100 may also have a skin temperature limit. Thus, it is important to dissipate the heat generated from energy losses in the electronic glasses 100 to maintain the electronic glasses 100 within both its thermal limit and skin temperature limit. However, the form factor of the electronic glasses 100 being of a particularly smaller form factor can make the dissipation of heat to keep the electronic glasses 100 within its thermal limit an/or skin temperature limit more challenging.

SUMMARY OF THE DISCLOSURE

Aspects disclosed herein include head-mounted electronic device incorporating a piezo-electric device for dissipation of heat. Related methods of controlling the piezo-electric device to dissipate heat from the head-mounted electronic device are also disclosed. For example, the head-mounted electronic device could be a virtual reality (VR), augmented reality (AR), or extended reality (XR) head-mounted display device that incorporates an integrated display(s) and electronic circuitry to drive the display(s) and/or provide other functionality. The electronic circuitry incorporated in the head-mounted electronic device includes an integrated circuit (IC) (e.g., a computing device) configured to control the integrated display(s). Increased performance of the IC can be achieved by operating the IC at an increased operating voltage and/or operating frequency, but such will increase power consumption of the IC generating additional heat due to increased energy losses. In this regard, in exemplary aspects, to dissipate heat in the head-mounted electronic device, a piezo-electric device(s) is integrated in the head-mounted electronic device. The piezo-electric device is fluidly coupled to an internal air chamber in the head-mounted electronic device that is in fluid communication with the IC. The piezo-electric device can be electronically controlled to draw the heated air around the IC into an internal chamber that heats air inside the internal chamber as a form of convection cooling of the IC. The piezo-electric device is configured to pump heated air in the internal chamber through an outlet to dissipate the heated air from the internal chamber. The piezo-electric device can be arranged such that it dissipates the heated air through the outlet external to the head-mounted electronic device. Dissipation of the heated air heated from heat generated from the IC can keep the IC from exceeding its thermal limits and/or prevent the head-mounted electronic device from exceeding its skin temperature limit. The piezo-electric device can extend the thermal performance envelope of head-mounted electronic devices that may otherwise be subject to skin and junction temperature limits.

In one example, the piezo-electric device includes a piezo-electric element that can be excited by electrical signals generated by electronic circuitry integrated in the head-mounted electronic device. In an example, the piezo-electric element is disposed in a housing as part of the piezo-electric device that has an inlet and outlet. The piezo-electric element is in fluid communication with the inlet of the housing of the piezo-electric device. The inlet is in fluid communication with the internal chamber in the head-mounted display device. The piezo-electric element is also in contact with a pump chamber that is adjacent to the outlet of the housing of the piezo-electric device. In response to the piezo-electric element receiving electrical signals, the piezo-electric element vibrates to vibrate (e.g., continuously contract and uncontract) the pump chamber to create a pressure differential inside the housing between the inlet and the outlet. The pressure differential created in the housing directs air from the inlet of the housing to the outlet of the housing to draw in air into the inlet and dissipate such air through the outlet. One benefit of such an exemplary piezo-electric device is that it can be provided in a thin form factor that may more easily be integrated into a head-mounted electronic device, such as the arm(s) or frame of electronic glasses. Another benefit such an exemplary piezo-electric device is that its pump mechanism can operate with lower power consumption. Another benefit of such an exemplary piezo-electric device is that its pump mechanism can operate at lower noise levels, as compared to a fan device that has spinning blades, so as to not disturb the user of the head-mounted electronic device.

In another example, the head-mounted electronic device can be provided in the form of electronic glasses that include an integrated display in one or more lenses of the electronic glasses. As an example, a piezo-electric device(s) can be integrated into an arm(s) or frame of the electronic glasses. The IC may also be integrated into an arm or frame of the electronic glasses that also contains an internal air chamber. In this manner, the heated air in the internal chamber generated as a result of the heat generated by the IC is in fluid communication with the piezo-electric device(s). The piezo-electric device(s) can pump the heated air present in the internal chamber, to an outlet to dissipate the heat. As an example, the outlet may be disposed in a housing of the piezo-electric device that is externally exposed through the arm(s) or frame of the electronic glasses to dissipate the heated air external to the electronic glasses. The electronic glasses can also include an air intake inlet in fluid communication with the air chamber to provide make-up air for the air dissipated by the piezo-electric device. For example, the air intake inlet may be provided at the hinge between the arm and the frame of the electronic glasses. The hinge of the electronic glasses may be constructed such that it provides a natural leak into the air chamber in the arm.

The piezo-electric device may be integrated into any area of a head-mounted electronic device that is in fluid communication with an internal chamber that contains air heated by the heat generated by the IC. The piezo-electric device may be integrated into any area of the head-mounted electronic device the allows air heated by the heat generated by the IC to be dissipated, including being dissipated external to the head-mounted electronic device. The piezo-electric device can be controlled by electronic circuitry in the head-mounted electronic device to be turned on and off when desired. For example, electronic circuitry in the head-mounted electronic device may be configured to selectively turn on and off the piezo-electric device based on the temperature in the head-mounted electronic device. For example, the head-mounted electronic device may include a thermocouple or thermostat that is coupled to the electronic circuitry to turn on and off the piezo-electric device in response to such temperature exceeding and not exceeding a defined or programmed temperature limit, respectively.

In this regard, in one exemplary aspect, a head-mounted electronic device is provided. The head-mounted electronic device comprises a body comprising a first internal chamber. The head-mounted electronic device also comprises a first IC integrated into the body and in fluid communication with the first internal chamber. The head-mounted electronic device also comprises a first piezo-electric device comprising a first inlet in fluid communication with the first internal chamber, and a first outlet. The first IC is configured to generate heat to heat air in the first internal chamber. The first piezo-electric device is configured to dissipate the air in the first internal chamber to the first outlet In another exemplary aspect, a method of dissipating heat from a head-mounted electronic device is provided. The head-mounted electronic device comprising a body comprising an internal chamber, an IC integrated into the body and in fluid communication with the internal chamber, a piezo-electric device comprising an inlet in fluid communication with the internal chamber and an outlet, a temperature sensor coupled to the head-mounted electronic device, and an electronic control circuit electrically coupled to the temperature sensor and the piezo-electric device. The method comprises the electronic control circuit operating the IC such that the IC generates heat in the internal chamber to heat air in the internal chamber, and generating electrical signals to the piezo-electric device to cause the piezo-electric device to dissipate the heated air in the internal chamber to the outlet.

BRIEF DESCRIPTION OF THE FIGURES

FIGS. 3B and 3C are side, perspective views illustrating an arm of the electronic glasses in FIG. 3A illustrating the piezo-electric device having an inlet that is fluidly coupled to an internal chamber of the arm that is fluidly coupled to the IC, and an outlet that is disposed external to the arm, wherein the piezo-electric device is configured to pump air out of the internal chamber from the inlet to the outlet to dissipate the air from the electronic glasses;

FIGS. 6B-1-6B-2 are side views of exemplary arms of the electronic glasses in FIG. 6A that include one or more integrated piezo-electric devices configured to pump heated air heated by heat generated from an IC out of the internal chamber to dissipate the air from the electronic glasses;

DETAILED DESCRIPTION

Figure 1:
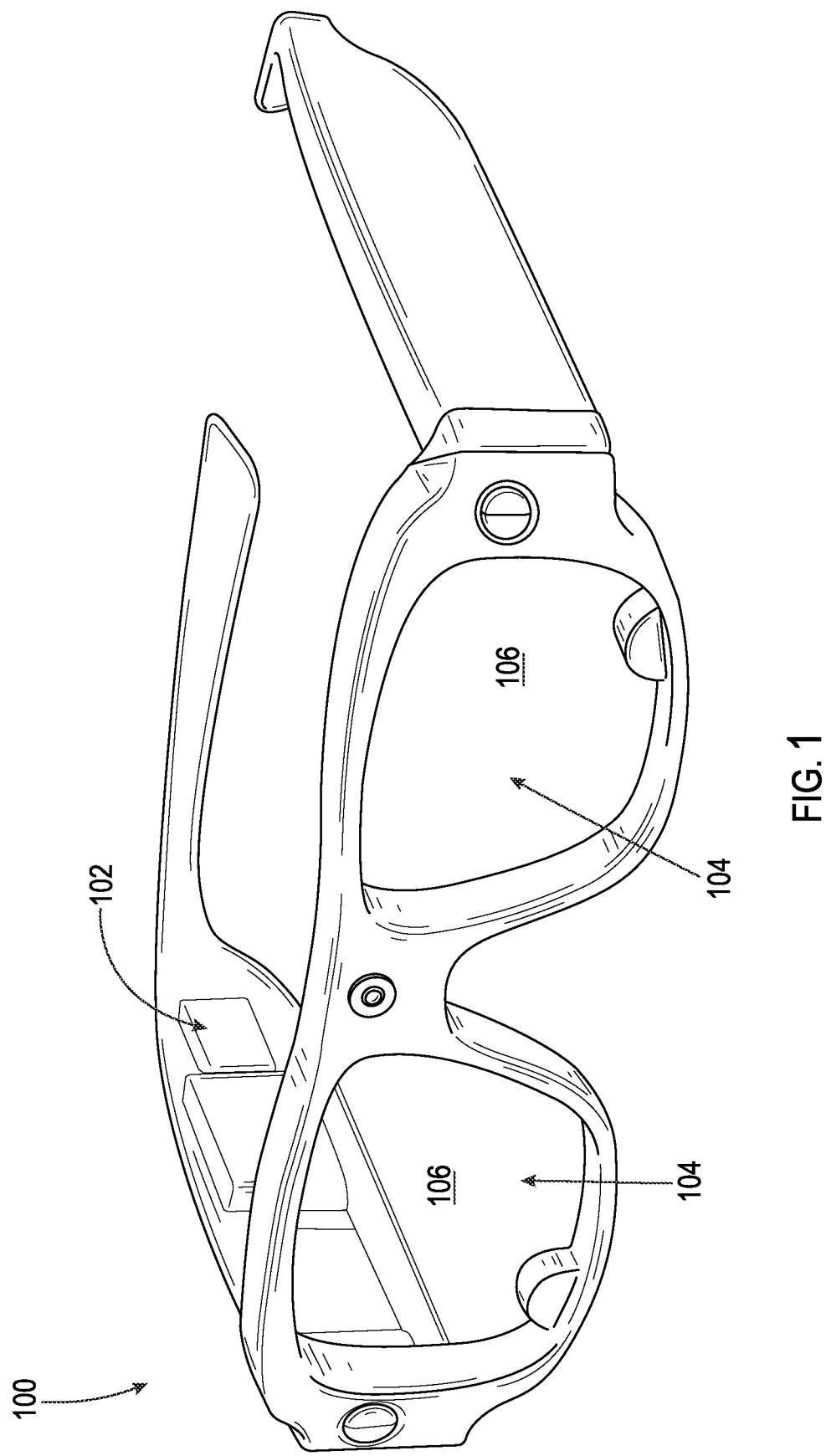
FIG. 1 is a front, perspective view of an exemplary head-mounted electronic device in the form of electronic glasses.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include head-mounted electronic device incorporating a piezo-electric device for dissipation of heat. Related methods of controlling the piezo-electric device to dissipate heat from the head-mounted electronic device are also disclosed. For example, the head-mounted electronic device could be a virtual reality (VR), augmented reality (AR), or extended reality (XR) head-mounted display device that incorporates an integrated display(s) and electronic circuitry to drive the display(s) and/or provide other functionality. The electronic circuitry incorporated in the head-mounted electronic device includes an integrated circuit (IC) that includes an integrated circuit (IC) (e.g., a computing device) configured to control the integrated display(s). Increased performance of the IC can be achieved by operating the IC at an increased operating voltage and/or operating frequency, but such will increase power consumption of the IC generating additional heat due increased energy losses. In this regard, in exemplary aspects, to dissipate heat in the head-mounted electronic device, a piezo-electric device(s) is integrated in the head-mounted electronic device. The piezo-electric device is fluidly coupled to an internal air chamber in the head-mounted electronic device that in fluid communication with the IC. The piezo-electric device can be electronically controlled to draw the heated air around the IC into the internal chamber that heats air inside the internal chamber as a form of convection cooling of the IC. The piezo-electric device is configured to pump heated air in the internal chamber through an outlet to dissipate the heated air from the internal chamber. The piezo-electric device can be arranged such that it dissipates the heated air through the outlet external to the head-mounted electronic device. Dissipation of the heated air heated from heat generated from the IC can keep the IC from exceeding its thermal limits and/or prevent the head-mounted electronic device from exceeding its skin temperature limit. The piezo-electric device can extend thermal performance envelope of head-mounted electronic device that may otherwise be subject to skin and junction temperature limits.

In one example, the piezo-electric device includes a piezo-electric element that can be excited by electrical signals generated by electronic circuitry integrated in the head-mounted electronic device. In an example, the piezo-electric element is disposed in a housing as part of piezo-electric device that has an inlet and outlet. The piezo-electric element is in fluid communication with the inlet of the housing of the piezo-electric device. The inlet is in fluid communication with the air chamber in the head-mounted display device. The piezo-electric element is also in contact with a pump chamber that is adjacent to the outlet of the housing of the piezo-electric device. In response to the piezo-electric element receiving electric signals, the piezo-electric element vibrates to vibrate (e.g., continuously contract and uncontract) the pump chamber to create a pressure differential inside the housing between the inlet and the outlet. The pressure differential created in the housing directs air from the inlet of the housing to the outlet of the housing to draw in air into the inlet and dissipate such air through the outlet. One benefit such an exemplary piezo-electric device is that it can be provided in a thin form factor that may more easily be integrated into a head-mounted electronic device, such as the arm(s) or frame of electronic glasses. Another benefit such an exemplary piezo-electric device is that its pump mechanism can operate with lower power consumption. Another benefit such an exemplary piezo-electric device is that its pump mechanism can operate at lower noise levels, as compared to a fan device that has spinning blades, so as to not disturb the user of the head-mounted electronic device.

Figure 2A:
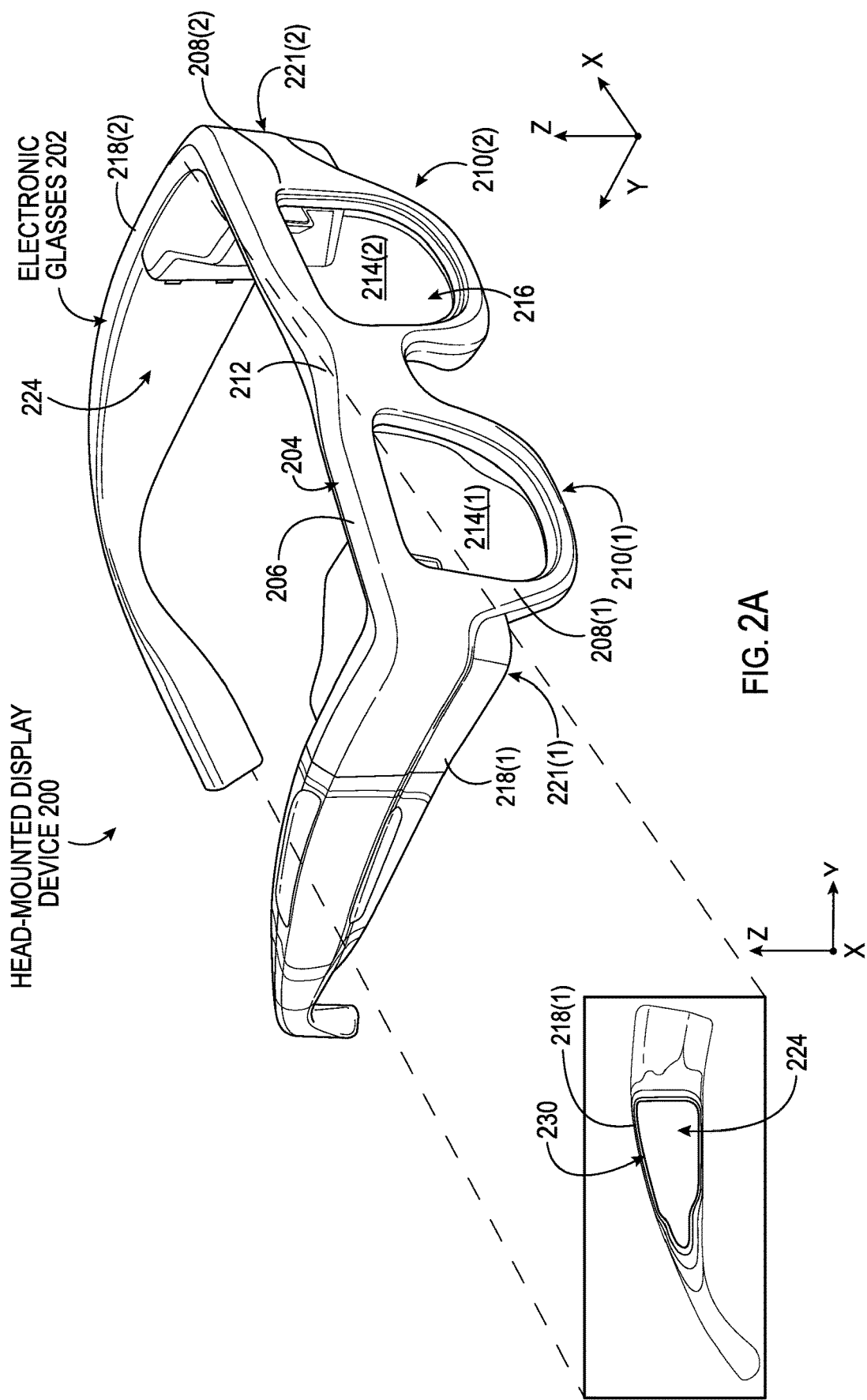
FIG. 2A is a side, perspective view of another exemplary head-mounted electronic device in the form of electronic glasses that illustrates a thermal gradient in an arm of the electronic glasses due to temperature hot spots created by the dissipation of heat of an integrated circuit (IC) chip incorporated into the electronic glasses.
Figure 2B:
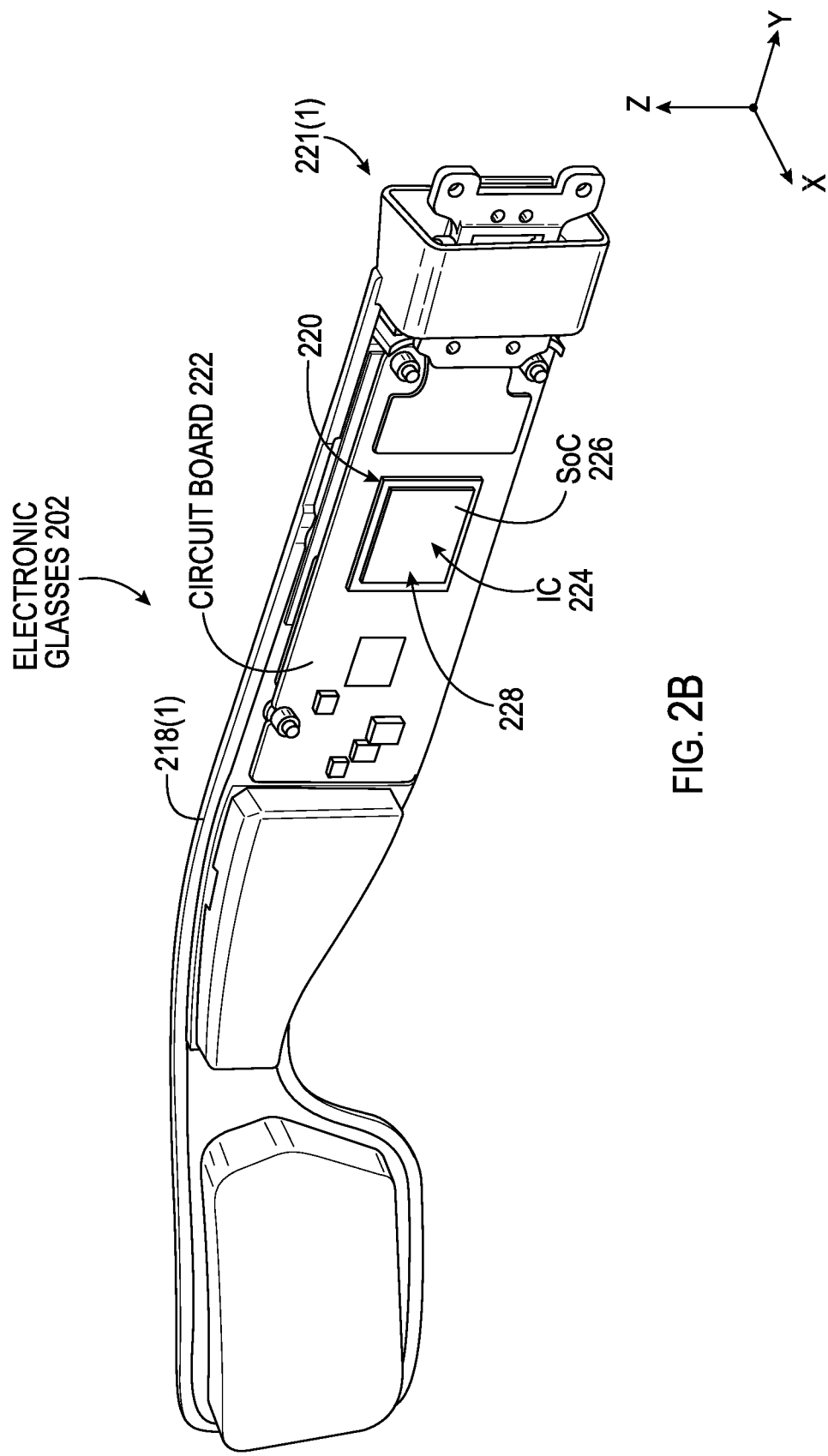
FIG. 2B is a side, perspective view of an arm of the electronic glasses in FIG. 2A illustrating the IC chip attached to a circuit board incorporated into the arm of the electronic glasses.

Before discussing exemplary head-mounted electronic devices that include one or more integrated piezo-electric devices configured to pump heated air heated by heat generated from an IC out of the internal chamber to dissipate the air from the head-mounted electronic devices starting at FIG. 3, an exemplary head-mounted electronic device that does not include a pump to dissipate heat is first described with regard to FIGS. 2A and 2B.

In this regard, FIG. 2A is a side, perspective view of a head-mounted electronic device 200 in the form of electronic glasses 202. The electronic glasses 202 have a body 204 that includes a frame 206 that includes a first lens holder 208(1) and a second lens holder 208(2) attached to and disposed on respective first and second sides 210(1), 210(2) of a bridge 212 in a horizontal direction (X-axis direction). The first and second lens holders 208(1), 208(2) each support respective first and second lenses 214(1), 214(2). One or each of the first and second lenses 214(1), 214(2) may include an integrated display 216 that is configured to generate a visual image viewable by a user wearing the electronic glasses 202. The electronic glasses 202 also include first and second arms 218(1), 218(2) that are coupled to respective third and fourth sides 221(1), 221(2) of the respective first and second lens holders 208(1), 208(2) and on opposite sides from each other in a horizontal direction (X-axis direction). FIG. 2B also shows the first arm 218(1) of the electronic glasses 202 in FIG. 2A illustrating an internal chamber 220 that contains a circuit board 222 that includes an IC 224 in the form of a system-on-a-chip (SoC) 226. In this example, the SoC 226 includes a computing device 228 that may be a processor or controller that includes circuitry configured to execute instructions to perform tasks related to the electronic glasses 202, including driving the integrated display 216 (see FIG. 2A).

With continuing reference to FIG. 2B, because the SoC 226 consumes power in operation, the SoC 226 and its IC 224 generate heat due to energy losses. These energy losses increase as a result of increased performance in the IC 224 (e.g., an increased voltage and/or operation frequency) thus generating additional heat and elevated temperatures on the body 204 of the electronic glasses 202. This is shown in a temperature gradient 230 in the first arm 218(1) of the electronic glasses 202 in FIG. 2A. As shown therein, there is an elevated temperature in the area of the IC 224 that may generate temperatures in the first arm 218(1) and surrounding areas that are beyond the thermal limit of the IC 224 and/or a skin temperature limit of a user wearing the electronic glasses 202.

Figure 3A:
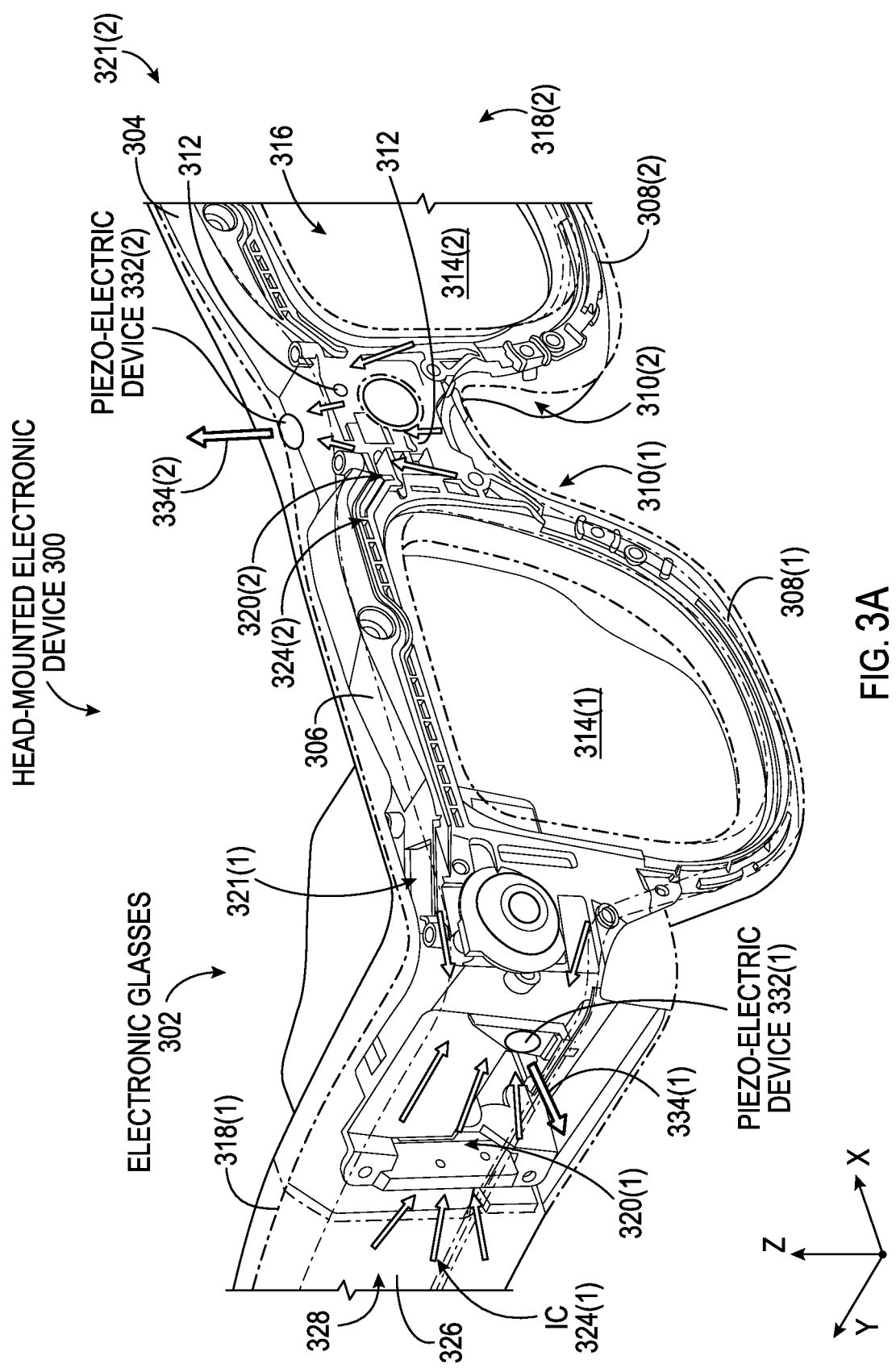
FIG. 3A is a side, perspective view of another exemplary head-mounted electronic device in the form of electronic glasses that includes one or more integrated piezo-electric devices configured to pump heated air heated by heat generated from an IC out of the internal chamber to dissipate the air from the electronic glasses.

FIG. 3A is a side, perspective view of another exemplary head-mounted electronic device 300 in the form of electronic glasses 302 that is similar to the electronic glasses 202 in FIGS. 2A and 2B. However, as discussed in more detail below, the electronic glasses 302 in FIG. 3 include first and second piezo-electric devices 332(1), 332(2) that are configured to pump heated air 334(1), 334(2) from respective first and second internal chambers 320(1), 320(2) in the respective first arm 318(1) and bridge 312 of the electronic glasses 302. For example, the first arm 318(1) may include an integrated first IC 324(1) that is either inside the first internal chamber 320(1) or fluidly coupled to the first internal chamber 320(1). Thus, when the first IC 324(1) is operational, it will heat air 334(1) inside the first internal chamber 320(1) as a result of heat generated from energy losses. Similarly, a second IC 324(2) may be fluidly coupled to the second internal chamber 320(2) such that when the second IC 324(2) in fluid communication with the second internal chamber 320(2) is operational, it will also heat air 334(2) inside the second internal chamber 320(2) as a result of heat generated from energy losses. Thus, as discussed in more detail below, the first and second piezo-electric devices 332(1), 332(2), being in fluid communication with the respective first and second internal chambers 320(1), 320(2), are configured to pump the heated air 334(1), 334(2) from and out of the respective first and second internal chambers 320(1), 320(2) external to the body 304 of the electronic glasses 302 to dissipate the heated air 334(1), 334(2) away from the electronic glasses 302. The first and second piezo-electric devices 332(1), 332(2) can be electronically controlled, such as by the first and second ICs 324(1), 324(2), to draw the air 334(1), 334(2) into the first and second internal chambers 320(1), 320(2) that heats air inside the first and second internal chambers 320(1), 320(2) as a form of convection cooling of the first and second ICs 324(1), 324(2).

In this manner, dissipation of the heated air 334(1), 334(2) generated from heat generated by the first and second ICs 324(1), 324(2) in the electronic glasses 302 can keep the first and second ICs 324(1), 324(2) from exceeding their thermal limits. Dissipation of the heated air 334(1), 334(2) can also prevent the electronic glasses 302 from exceeding its skin temperature limit. The first and second piezo-electric devices 332(1), 332(2) can extend the thermal performance envelope of the electronic glasses 302 that may otherwise be subject to skin and junction temperature limits.

With reference to FIG. 3A, the electronic glasses 302 have the body 304 that includes a frame 306 that includes a first lens holder 308(1) and a second lens holder 308(2) attached to and disposed on respective first and second sides 310(1), 310(2) of a bridge 312 in a horizontal direction (X-axis direction). The first and second lens holders 308(1). 308(2) each support respective first and second lenses 314(1), 314(2). One or each of the first and second lenses 314(1), 314(2) may include an integrated display 316 that is configured to generate a visual image viewable by a user wearing the electronic glasses 302. The electronic glasses 302 also include first and second arms 318(1), 318(2) (as shown in FIGS. 3B and 3C) that are coupled to respective third and fourth sides 321(1), 321(2) of the respective first and second lens holders 308(1), 308(2) and on opposite sides from each other in a horizontal direction (X-axis direction). In this example, the first IC 324(1) is in the form of a SoC 326 that includes a computing device 328 that may be a processor or controller that includes circuitry configured to execute instructions to perform tasks related to the electronic glasses 302, including driving the integrated display 316.

FIGS. 3B and 3C are side, perspective views illustrating the first arm 318(1) of the electronic glasses 302 in FIG. 3A that includes the first piezo-electric device 332(1). The first piezo-electric device 332(1) is configured to pump the heated air 334(1) (FIG. 3A) from and out of the respective first internal chamber 320(1) external to the body 304 of the electronic glasses 302 to dissipate the heated air 334(1) away from the electronic glasses 302. If the first internal chamber 320(1) is also fluidly coupled to the second internal chamber 320(2), the first piezo-electric device 332(1) may also be configured to pump the heated air 334(2) (FIG. 3A) from and out of the respective second internal chamber 320(2) external to the body 304 of the electronic glasses 302 to dissipate the heated air 334(2) away from the electronic glasses 302. FIG. 3C shows an external view of the first arm 318(1) that has a first external surface 336(1). FIG. 3B shows an internal view of the first arm 318(1) that does not include the first external surface 336(1).

As shown in FIG. 3C, the first piezo-electric device 332(1) is mounted to the first external surface 336(1) of the first arm 318(1) in this example. FIG. 3B also illustrates the first piezo-electric device 332(1) as fluidly coupled to the first internal chamber 320(1) of the first arm 318(1). As shown in FIG. 3B, the first internal chamber 320(1) of the first arm 318(1) in this example contains a circuit board 322 that includes the first IC 324(1) in the form of the SoC 326. In this example, the SoC 326 includes the computing device 328 that may be a processor or controller that includes circuitry configured to execute instructions to perform tasks related to the electronic glasses 302, including driving the integrated display 316 (see FIG. 3A). Because the SoC 326 consumes power in operation, the SoC 326 and its first IC 324(1) generate heat due to energy losses. These energy losses increase as a result of increased performance in the first IC 324(1) (e.g., an increased voltage and/or operation frequency) thus generating additional heat and elevated temperatures on the body 304 of the electronic glasses 302. Thus, in this example, as shown in FIGS. 3B and 3C, the first piezo-electric device 332(1) that is fluidly coupled to the first internal chamber 320(1) includes a first outlet 338(1). The first piezo-electric device 332(1) is configured to direct and dissipate the heated air 334(1) (FIG. 3A) from the first internal chamber 320(1) to and out of the first outlet 338(1) to dissipate the heated air 334(1) from the electronic glasses 302. This is also illustrated in more detail in FIG. 3D, now discussed.

Figure 3D:
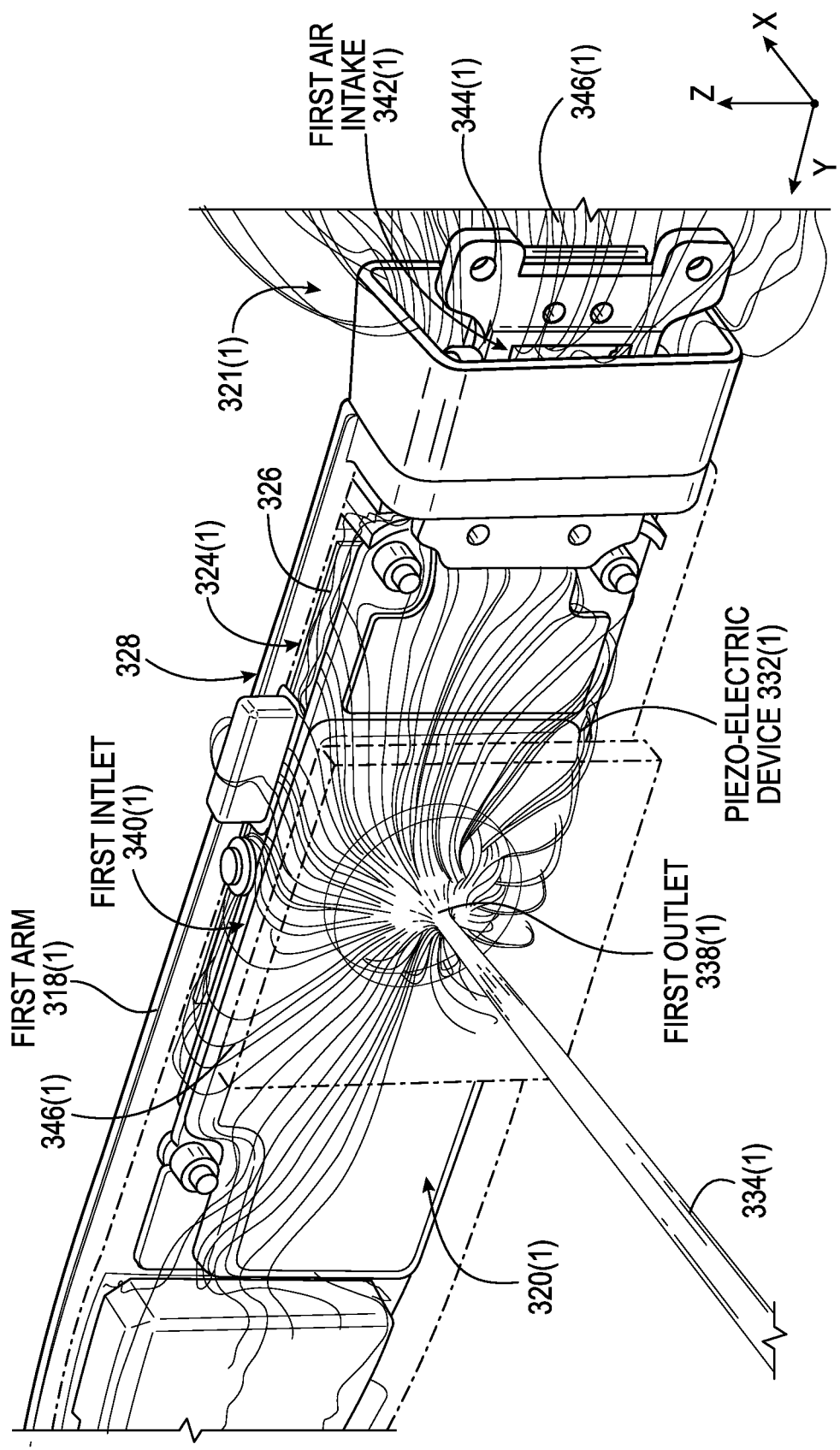
FIG. 3D is a side view of the arm of the electronic glasses in FIG. 3A illustrating the air flow of the heated air pumped out by the piezo-electric device from the internal chamber into the inlet and out of the outlet to dissipate the air from the electronic glasses.

In this regard, FIG. 3D is a side view of the first arm 318(1) of the electronic glasses 302 in FIG. 3A illustrating the air flow of the heated air 334(1) pumped by the first piezo-electric device 332(1) from the first internal chamber 320(1) into a first inlet 340(1) and out of the first outlet 338(1). This dissipates the heated air 334(1) from the first internal chamber 320(1) of the first arm 318(1) of the electronic glasses 302, to an area outside of the electronic glasses 302. To provide a supply of air to replace the heated air 334(1) pumped out of the first outlet 338(1) of the first piezo-electric device 332(1), the electronic glasses 302, and more particularly its first arm 318(1) includes a first air intake 342(1) disposed in the body 304. The first air intake 342(1) is fluidly coupled to the first internal chamber 320(1). In this example, the first air intake 342(1) is provided by natural leak points around a first hinge 344(1) that couples the first arm 318(1) to the frame 306 (FIG. 3A) of the electronic glasses 302. In this manner, as the first piezo-electric device 332(1) pumps heated air 334(1) out of the first internal chamber 320(1), first intake air 346(1) is drawn into the first internal chamber 320(1) as make-up air through the first air intake 342(1). The first intake air 346(1) will initially have the temperature of ambient air around the first air intake 342(1). As the first intake air 346(1) is pumped by the first piezo-electric device 332(1), the first intake air 346(1) will pass proximate to the first IC 324(1) in the first internal chamber 320(1) and be heated by the heat generated by the first IC 324(1). This provides convection cooling of the first IC 324(1). The first piezo-electric device 332(1) pumps the first heated air 334(1) out of the first internal chamber 320(1) and out of the first outlet 338(1) to dissipate the first heated air 334(1).

Note that although FIGS. 3B-3D illustrate the first piezo-electric device 332(1) in fluid communication with the first internal chamber 320(1) in the first arm 318(1) to be able to pump the first heated air 334(1) out of the first arm 318(1), a piezo-electric device could also be provided in fluid communication with an internal chamber in the second arm 318(2) to be able to pump the heated air out of the second arm 318(2).

Also note that although FIGS. 3B-3D illustrate the first piezo-electric device 332(1) in fluid communication with the first internal chamber 320(1) to be able to pump the first heated air 334(1), the same concepts can also apply to the second piezo-electric device 332(2) as disposed in fluid communication with its second internal chamber 320(2) in the frame 306 and bridge 312 of the electronic glasses 302, as shown in FIG. 3A. The same first piezo-electric device 332(1) and its components can also be used as the second piezo-electric device 332(2). As previously discussed, the second IC 324(2) can be incorporated in the second internal chamber 320(2) of the electronic glasses 302, wherein the second piezo-electric device 332(2) can pump the second heated air 334(2) generated by such second IC 324(2) out of the bridge 312 of the electronic glasses 302.

Also note that the second internal chamber 320(2) of the electronic glasses 302 in FIG. 3A could be fluidly coupled to the first internal chamber 320(1). In this manner, if desired, the second piezo-electric device 332(2) could be omitted, such that the first piezo-electric device 332(1) pumps the second heated air 334(2) from the second internal chamber 320(2) into the first internal chamber 320(1) to be dissipated with the first heated air 334(1) out of the first arm 318(1). Further, as another alternative, the first piezo-electric device 332(1) could be omitted, such that the second piezo-electric device 332(2) pumps the first heated air 334(1) from the first internal chamber 320(1) into the second internal chamber 320(2) to be dissipated with the second heated air 334(2) out of the bridge 312. The electronic glasses 302 could include both the first and second ICs 324(1), 324(2) or just one of the first and second ICs 324(1), 324(2). Also, multiple piezo-electric devices like the first and/or second piezo-electric devices 332(1), 332(2) could be fluidly coupled to the same internal chamber, like the first and/or second internal chambers 320(1), 320(2) to provide extra pumping power.

With reference back to FIG. 3B, in this example, the electronic glasses 302, and in particularly its first arm 318(1), may also include an integrated temperature sensor 348 that is configured to detect the temperature around the temperature sensor 348. The temperature sensor 348 could be coupled to the circuit board 322 or provided elsewhere in the electronic glasses 302. The first and/or second ICs 324(1), 324(2) could also include a respective electronic control circuit 350 that is electrically coupled to the temperature sensor 348 and the first and/or second piezo-electric devices 332(1), 332(2). The electronic control circuit 350 could be configured to enable the operation of the computing device 328. The electronic control circuit 350 could be configured to enable the operation of the first and/or second piezo-electric devices 332(1), 332(2) when the computing device 328 is operational to pump the heated air 334(1), 334(2) out of the respective first and second internal chambers 320(1), 320(2) to dissipate the heated air 334(1), 334(2).

Figure 4:
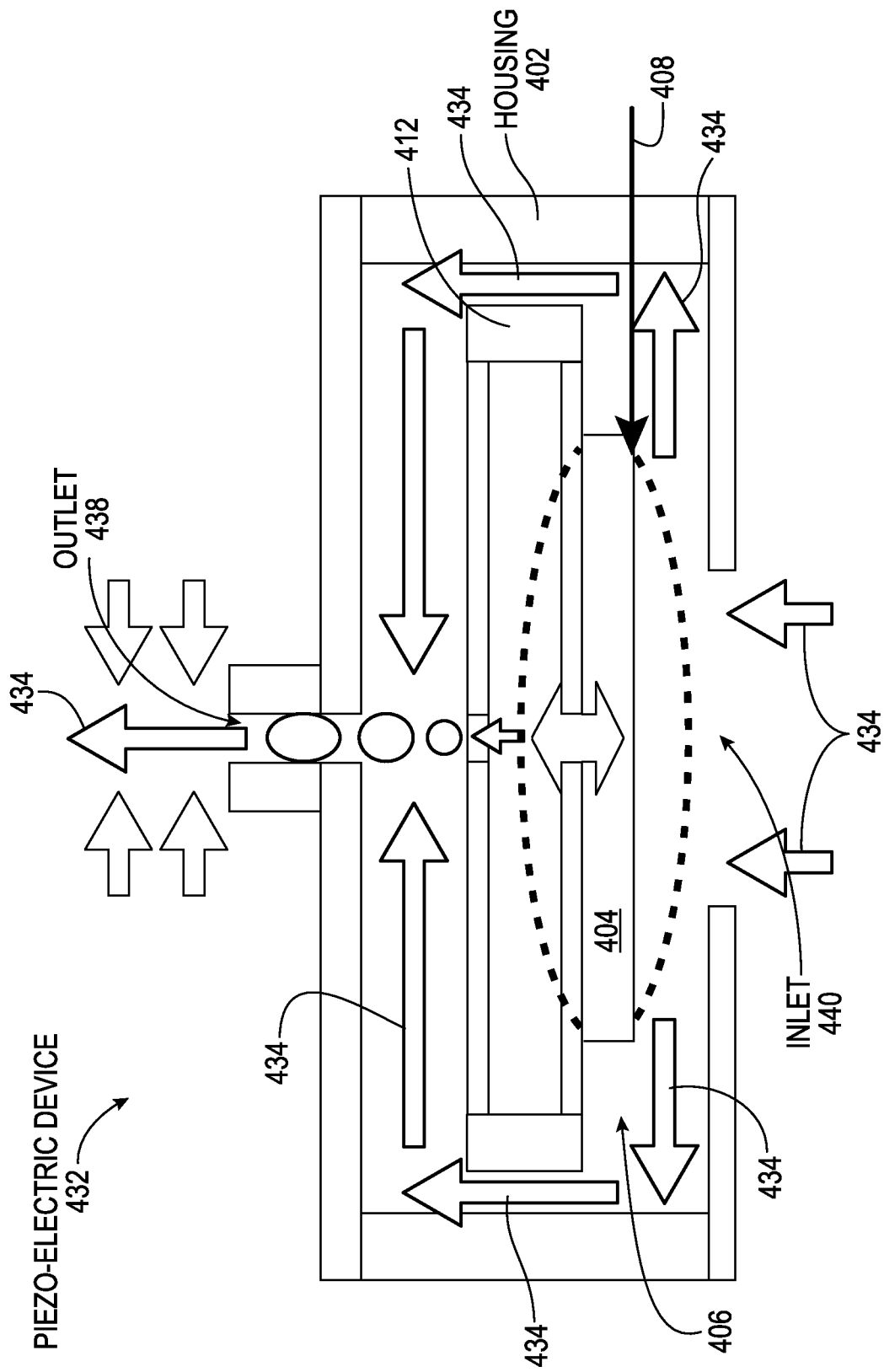
FIG. 4 is a block diagram of an exemplary piezo-electric device that includes a housing with an inlet and an outlet and a piezo-electric element in the housing that can be excited by electrical signals to cause a pump chamber in the housing to vibrate to create a pressure differential inside the housing between the inlet and the outlet to pump air from the inlet to the outlet.

FIG. 4 is a block diagram of an exemplary piezo-electric device 432 that could be the first and/or second piezo-electric devices 332(1), 332(2) incorporated in the electronic glasses 302 in FIGS. 3A-3D. In this example, the piezo-electric device 432 includes a housing 402 with an inlet 440 and an outlet 438. The inlet 440 is configured to be coupled to an internal chamber, like the first and/or second internal chambers 320(1), 320(2) in the electronic glasses 302 in FIGS. 3A-3D, to pull in air 434. The piezo-electric device 432 is configured to pump the air 434 from the inlet 440 disposed in the housing 402, to the outlet 438 disposed in the housing 402. As an example, the inlet 440 and outlet 438 could be the respective first and second inlets 340(1), 340(2) and first and second outlets 338(1), 338(2) of the first and second piezo-electric devices 332(1), 332(2) in the electronic glasses 302 in FIGS. 3A-3D. In this regard, in this example, the piezo-electric device 432 in FIG. 4 includes a piezo-electric element 404 that is disposed in an internal chamber 406 in the housing 402. For example, the piezo-electric element 404 could be a piezo-electric transducer or crystal, as a type of material that can convert an electrical voltage or signal into mechanical stress or pressure.

In response to an electrical signal 408, the piezo-electric element 404 is configured to vibrate to cause a pump chamber 412 to contract or compress and uncontract or uncompress to generate a pumping force. For example, the electrical signal 408 could be generated by the electronic control circuit 350 in the electronic glasses 302 in FIGS. 3A-3D. The piezo-electric element 404 is adjacent to and coupled to the pump chamber 412 such that mechanical stress or force generated by the piezo-electric element 404 is mechanically conveyed to the pump chamber 412. The pump chamber 412 is adjacent to the outlet 438 and can be a resilient, flexible material, such as a closed flexible membrane as an example, so that the pump chamber 412 can easy contract when under a force and then uncontract when not under a force. This creates a pressure differential between the inlet 440 and the outlet 438 to pump the heated air 434 in the internal chamber 406 to the outlet 438 to be dissipated.

The design of the piezo-electric device 432 with the piezo-electric element 404 and pump chamber 412 can be provided in a thinner form factor that may make integrating the piezo-electric device 432 into a head-mounted electronic device like the electronic glasses 302 more ergonomically feasible. Also, the piezo-electric device 432 can sustain small pressure differences and lower flow rates. The piezo-electric device 432 may generate less noise than other types of blowing devices, such as those with blades that spin, to provide an improved user experience.

A piezo-electric device, such as the piezo-electric devices 332(1), 332(2), 432 in FIGS. 3A-3D and 4 can also be provided in other areas and arrangements of a head-mounted electronic device, including electronic glasses like the electronic glasses 302 in FIGS. 3A-3D.

Figure 5A:
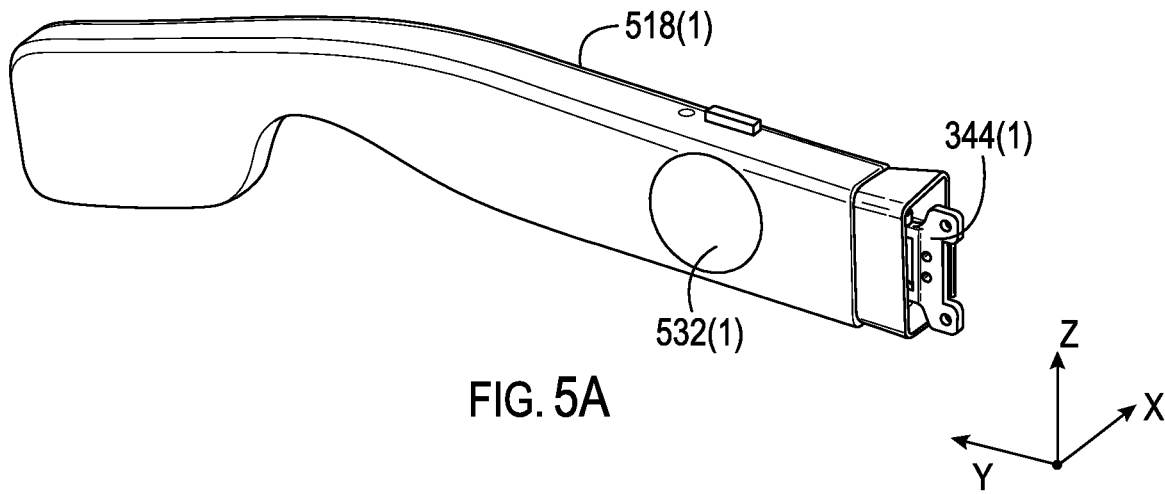
FIGS. 5A-5C are side views of exemplary arms of electronic glasses, including the arm of the electronic glasses in FIG. 3A, that include one or more integrated piezo-electric devices configured to pump heated air heated by heat generated from an IC out of the internal chamber to dissipate the air from the electronic glasses.
Figure 5B:
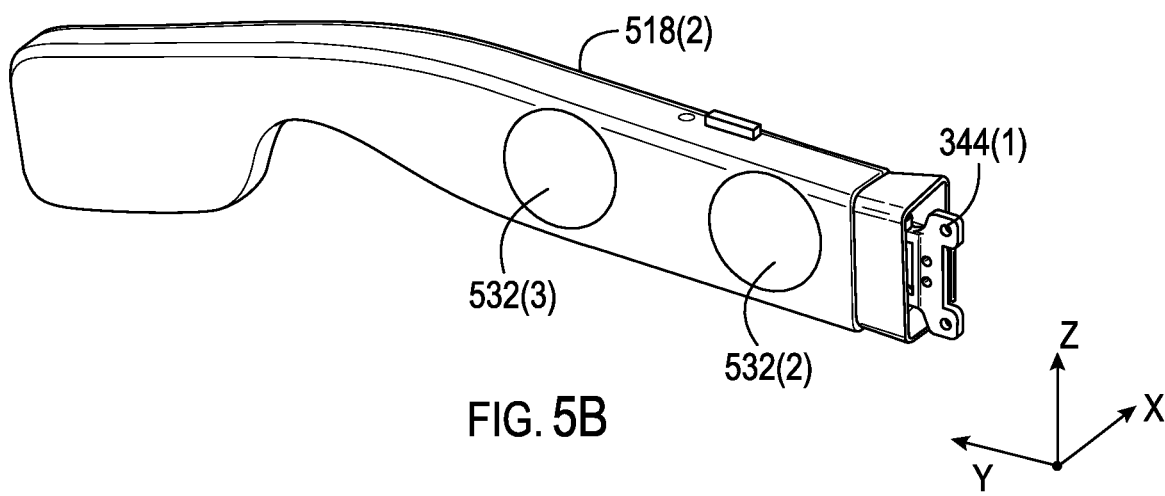
Figure 5C:
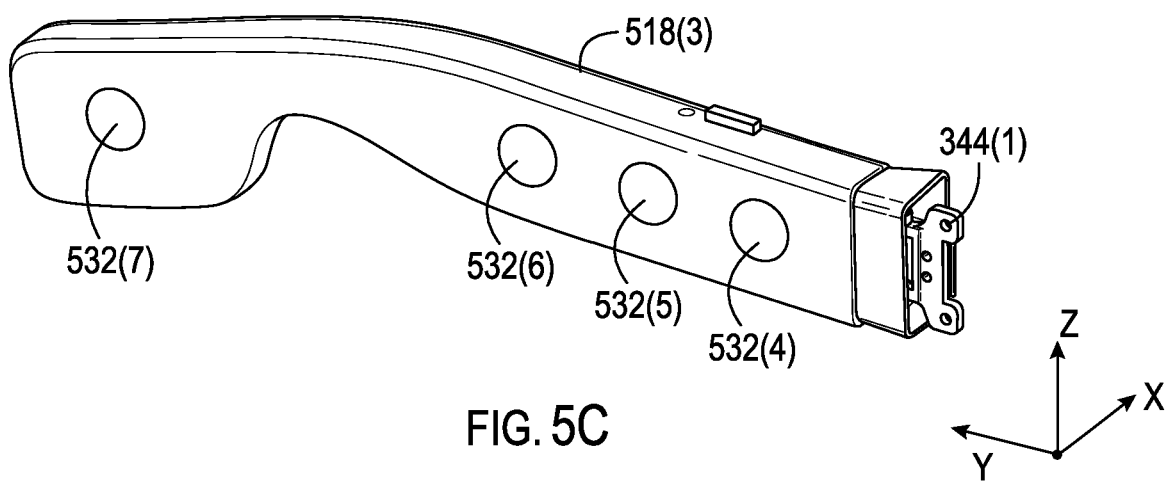

In this regard, FIGS. 5A-5C are side views of arms 518(1)-518(3) that can be included in a head-mounted electronic device in the form of electronic glasses, such as the electronic glasses 302 in FIGS. 3A-3D, and can incorporate one or more integrated piezo-electric devices configured to pump heated air heated by heat generated from an IC out of the internal chamber to dissipate the air from the electronic glasses. For example, the arm 518(1) in FIG. 5A includes a single piezo-electric device 532(1) that can be like the piezo-electric devices 332(1), 332(2), 432. The arm 518(2) in FIG. 5B includes two (2) piezo-electric devices 532(2), 532(3) that can be like the piezo-electric devices 332(1), 332(2), 432. The arm 518(3) in FIG. 5C includes four piezo-electric devices 532(4)-532(7) that can be like the piezo-electric devices 332(1), 332(2), 432.

Figure 6A:
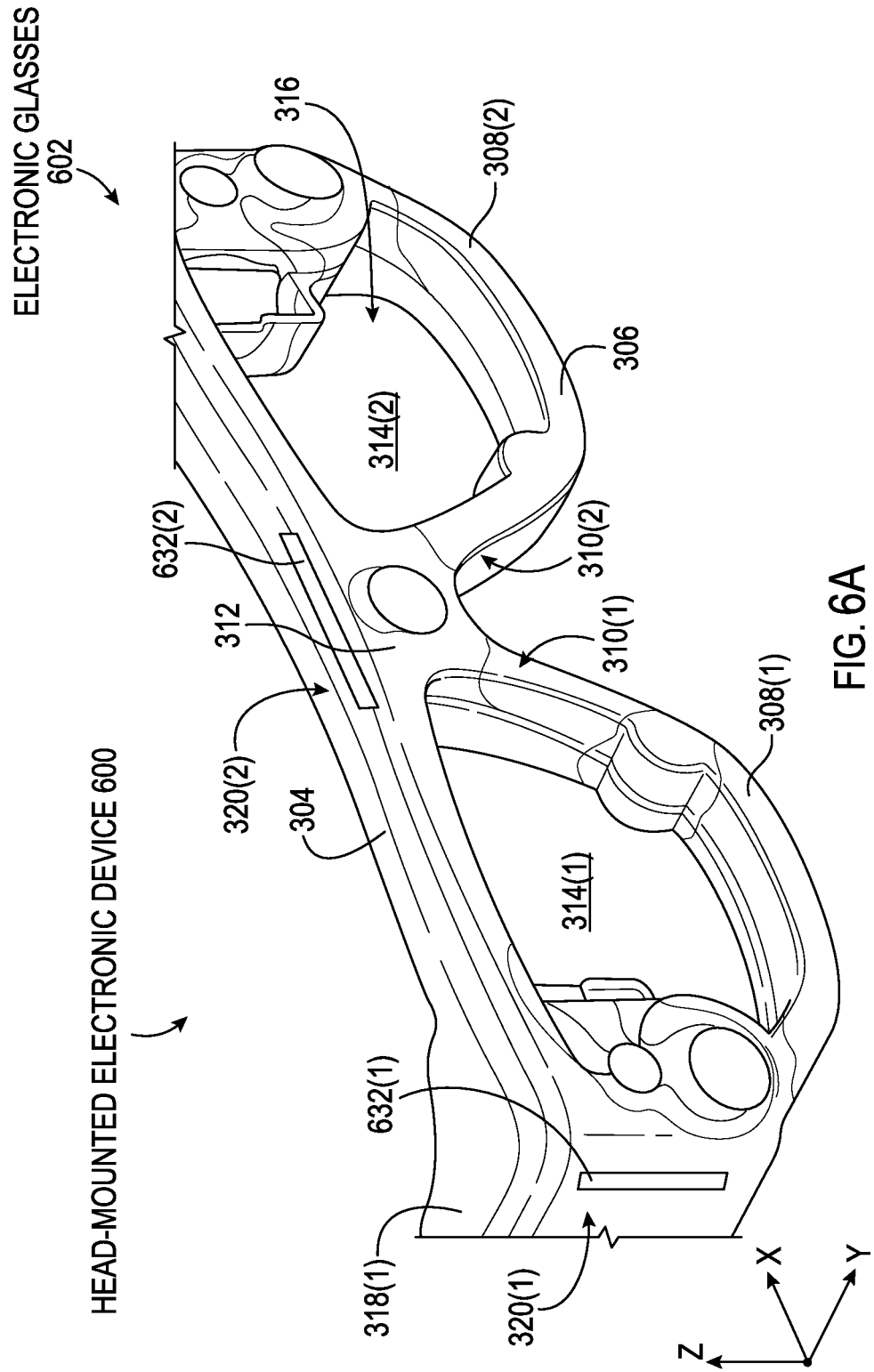
FIG. 6A is a side, perspective view of another exemplary head-mounted electronic device in the form of electronic glasses that includes one or more alternative integrated piezo-electric devices configured to pump heated air heated by heat generated from an IC out of the internal chamber to dissipate the air from the electronic glasses.

A piezo-electric device that is incorporated into a head-mounted electronic device, like electronic glasses, for dissipation of heated air can also be provided in different form factors. For example, FIG. 6A illustrates a head-mounted electronic device 600 in the form of electronic glasses 602 that are similar to the electronic glasses 302 in FIGS. 3A-3D. Common elements between the electronic glasses 602 in FIG. 6A and the electronic glasses 302 in FIGS. 3A-3D are shown with common element numbers. As shown in FIG. 6A, the electronic glasses 602 include a first piezo-electric device 632(1) that is elongated and integrated into the first arm 318(1). The first and second piezo-electric devices 632(1), 632(2) can be designed to function like the piezo-electric devices 332(1), 332, 432 in FIGS. 3A-3D and 4. The first and second piezo-electric devices 632(1), 632(2) are configured to pump heat out of the respective first and second internal chambers 320(1), 320(2).

Figures 1, 6B:
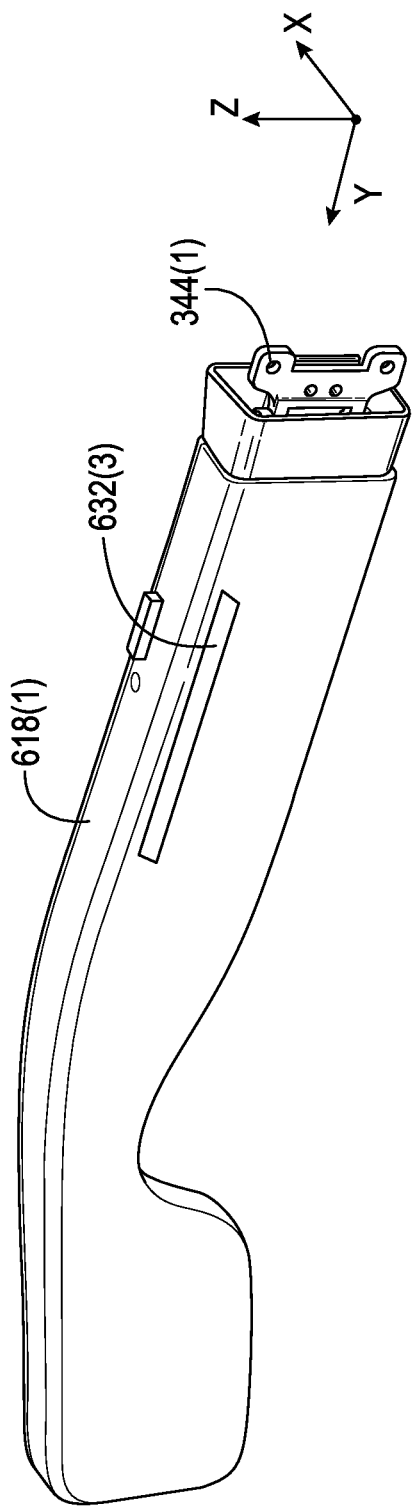
Figures 2, 6B:
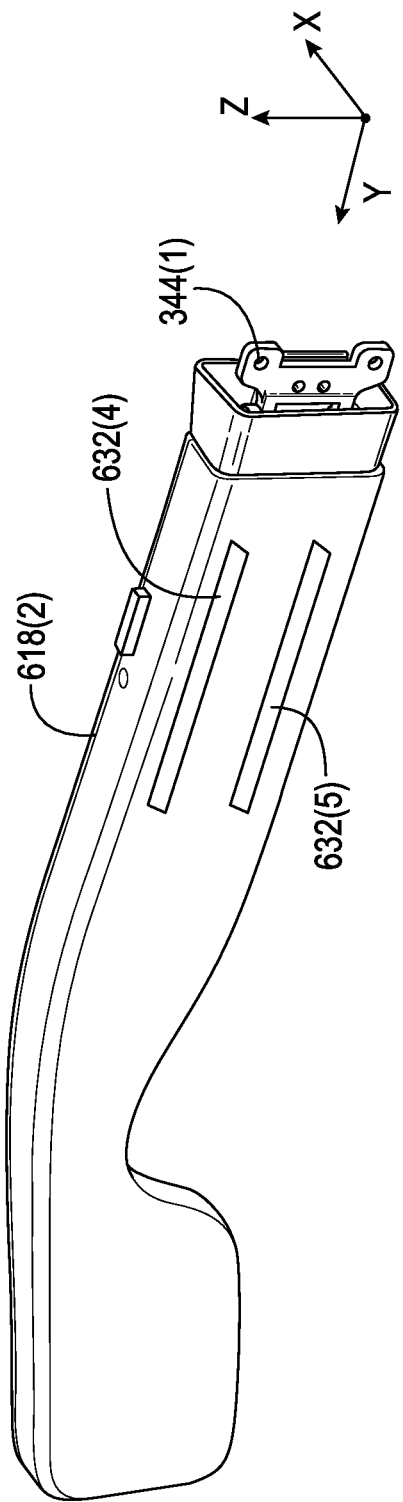

FIGS. 6B-1 and 6B-2 are side views of arms 618(1), 618(2) that can be included in a head-mounted electronic device in the form of electronic glasses, such as the electronic glasses 302 in FIG. 3A-3D, and can incorporate one or more integrated piezo-electric devices like the piezo-electric devices 632(1), 632(2) in FIG. 6A. For example, the arm 618(1) in FIG. 6B-1 includes a single piezo-electric device 632(3) that can be like the piezo-electric devices 632(1), 632(2) in FIG. 6A. The arm 618(2) in FIG. 6B-2 includes two (2) piezo-electric devices 632(4), 632(5) that can be like the piezo-electric devices 632(1), 632(2) in FIG. 6A.

Note that a component described as "mounted," "coupled," and "disposed on" herein is not limited to such component being directly or indirectly attached or coupled. Also note that an object being "adjacent" as discussed herein relates to an object being beside or next to another stated object. Adjacent objects may not be directly physically coupled to each other. An object can be directly adjacent to another object which means that such objects are directly beside or next to the other object without another object or layer being intervening or disposed between the directly adjacent objects. An object can be indirectly or non-directly adjacent to another object which means that such objects are not directly beside or directly next to each other, but there is an intervening object or layer disposed between the non-directly adjacent objects.

A head-mounted electronic device, including, but not limited to, the head-mounted electronic devices 300, 600 and/or its arms 318(1)-318(2), 518(1)-518(3), 618(1), 618(2) in FIGS. 3A-3D, 5A-5B, and 6A-6B-2, that includes one or more piezo-electric devices, including, but not limited to, the piezo-electric devices 332(1), 332(2), 432, 532(1)-532(7), 632(1)-632(5) in FIGS. 3A-3D, 5A-5B, and 6A-6B-2, configured to pump heated air heated by heat generated from an IC in the head-mounted electronic device out of the internal chamber to dissipate the air from the head-mounted electronic device, and according to any exemplary aspects discussed herein, may be provided in or integrated into any processor-based device. Examples of the head-mounted electronic device include, without limitation, include electronic glasses, including XR glasses, a head-mounted display device, an electronic watch, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 7:
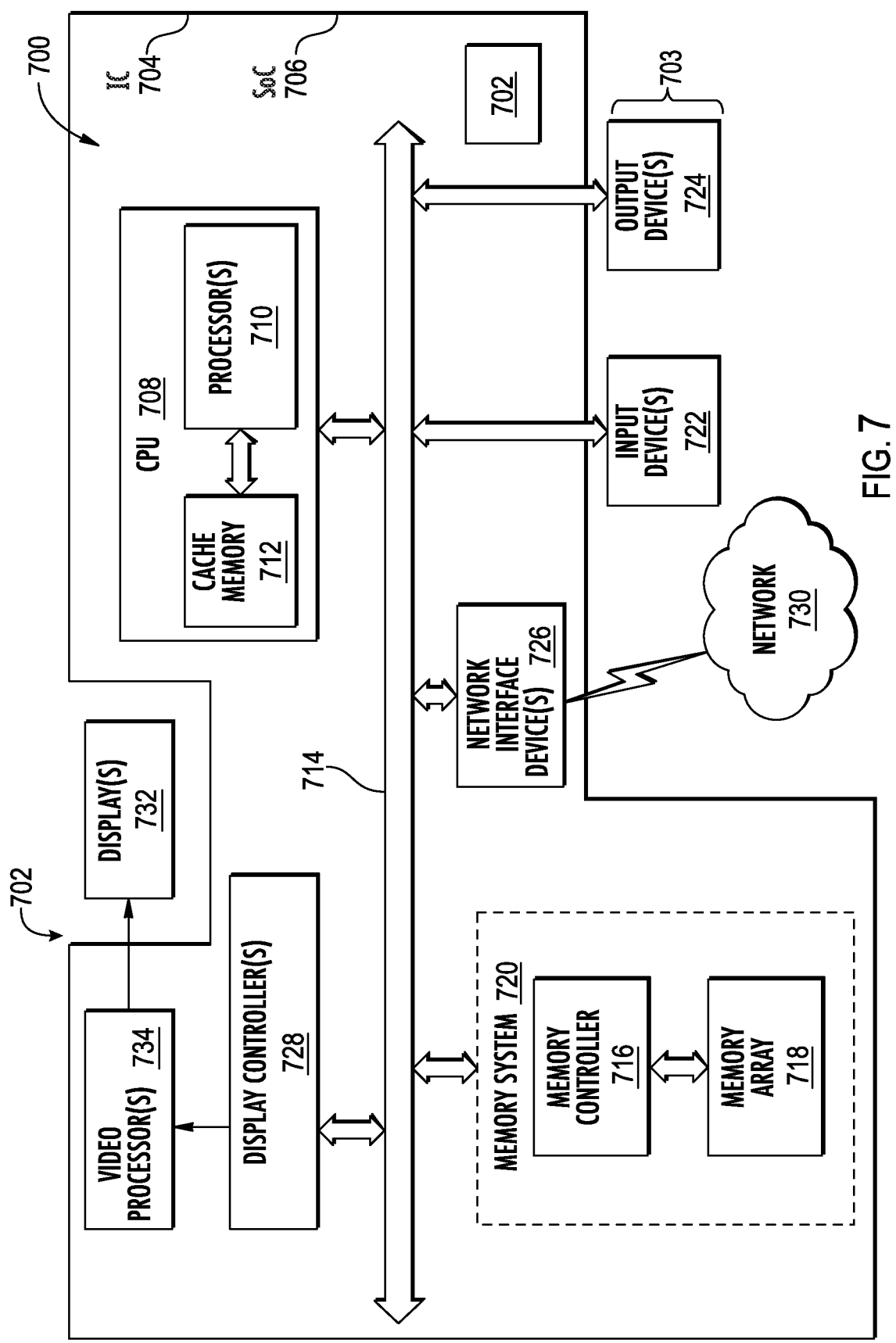
FIG. 7 is a block diagram of an exemplary electronic device that can be incorporated into a head-mounted electronic device, including, but not limited to, the head-mounted electronic device and/or its arms in FIGS. 3A-3D, 5A-5B, and 6A-6B-2 that includes one or more piezo-electric devices, including, but not limited to, the piezo-electric device in FIG. 4, wherein the electronic device includes a processor-based system that can include the IC that includes a computing device and is configured to electronically control the piezo-electric device to pump heated air heated by heat generated from an IC out of the internal chamber to dissipate the air from the head-mounted electronic device.

In this regard, FIG. 7 illustrates an electronic device in the form of a processor-based system 700 that can be incorporated into a head-mounted electronic device 702, including, but not limited to, the head-mounted electronic devices 300, 600 and/or its arms 318(1)-318(2), 518(1)-518(3), 618(1), 618(2) in FIGS. 3A-3D, 5A-5B, and 6A-6B-2, that includes one or more piezo-electric devices 703, including, but not limited to, the piezo-electric devices 332(1), 332(2), 432, 532(1)-532(7), 632(1)-632(5) in FIGS. 3A-3D, 5A-5B, and 6A-6B-2, configured to pump heated air heated by heat generated from an IC.

With reference to FIG. 7, the processor-based system 700 may be formed as an IC 704, that could be the first and/or second ICs 324(1), 324(2) in FIGS. 3A-3D, and as part of an IC package such as system-on-a-chip (SoC) 706. The processor-based system 700 includes a central processing unit (CPU) 708 that includes one or more processors 710, which may also be referred to as CPU cores or processor cores. The CPU 708 can be a computing device like the computing device 328 in FIGS. 3A-3D, and can be configured to control the activation of the piezo-electric device 703 to pump air for dissipation from the head-mounted electronic device 702. The CPU 708 may have cache memory 712 coupled to the CPU 708 for rapid access to temporarily stored data. The CPU 708 is coupled to a system bus 714 and can intercouple master and slave devices included in the processor-based system 700. As is well known, the CPU 708 communicates with these other devices by exchanging address, control, and data information over the system bus 714. For example, the CPU 708 can communicate bus transaction requests to a memory controller 716, as an example of a slave device. Although not illustrated in FIG. 7, multiple system buses 714 could be provided, wherein each system bus 714 constitutes a different fabric.

Other master and slave devices can be connected to the system bus 714. As illustrated in FIG. 7, these devices can include a memory system 720 that includes the memory controller 716 and a memory array(s) 718, one or more input devices 722, one or more output devices 724, which can include or be coupled to the piezo-electric device 703, one or more network interface devices 726, and one or more display controllers 728, as examples. The input device(s) 722 can include any type of input device, including, but not limited to, input keys, switches, voice processors, etc. The output device(s) 724 can include any type of output device, including, but not limited to, audio, video, other visual indicators, etc. The network interface device(s) 726 can be any device configured to allow exchange of data to and from a network 730. The network 730 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 726 can be configured to support any type of communications protocol desired.

The CPU 708 may also be configured to access the display controller(s) 728 over the system bus 714 to control information sent to one or more displays 732. The display controller(s) 728 sends information to the display(s) 732 to be displayed via one or more video processor(s) 734, which process the information to be displayed into a format suitable for the display(s) 732. The display(s) 732 can include any type of display, including, but not limited to, a cathode ray tube (CRT), a liquid crystal display (LCD), a plasma display, a light emitting diode (LED) display, etc.

Figure 8:
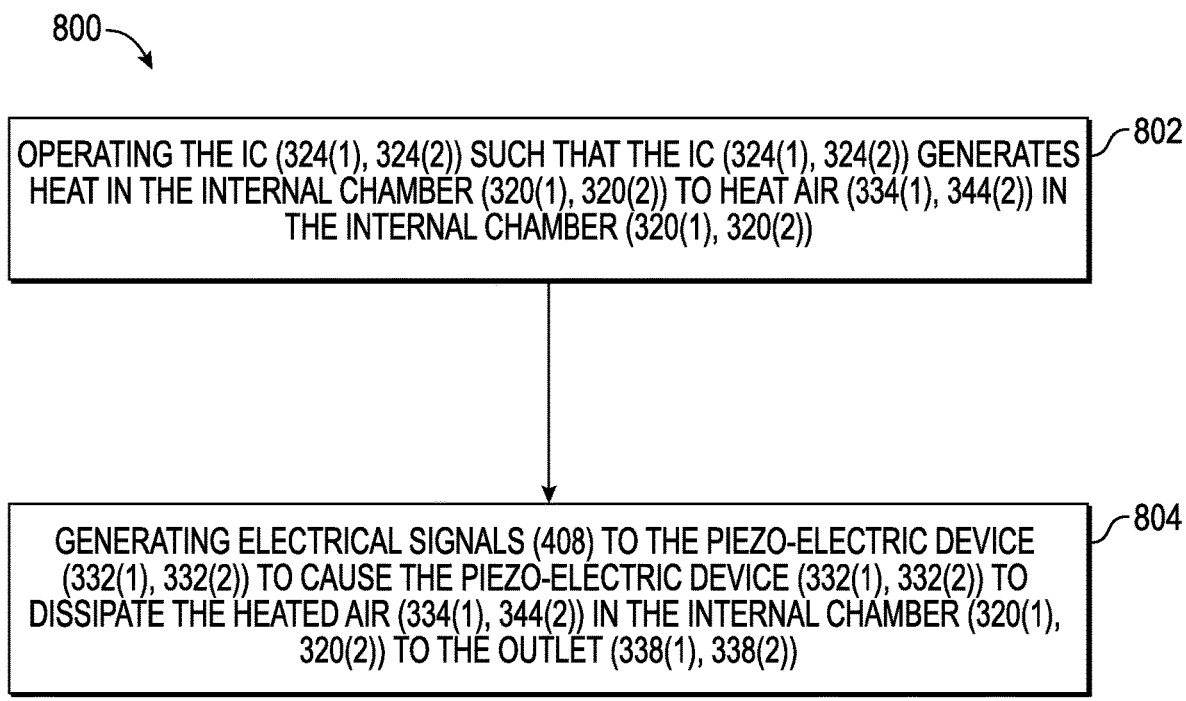
FIG. 8 is a flowchart illustrating an exemplary process of dissipating heat from a head-mounted electronic device, including, but not limited to, the head-mounted electronic device and/or its arms in FIGS. 3A-3D, 5A-5B, and 6A-6B-2, by an electronic device that can include an IC that includes a computing device controlling a piezo-electric device, including, but not limited to, the piezo-electric device in FIG. 4, to pump heated air heated by heat generated from an IC out of the internal chamber to dissipate the air from the head-mounted electronic device.

FIG. 8 is a flowchart illustrating an exemplary process 800 of dissipating heat from a head-mounted electronic device, including, but not limited to, the head-mounted electronic devices 300, 600 and/or its arms 318(1)-318(2), 518(1)-518(3), 618(1), 618(2) in FIGS. 3A-3D, 5A-5B, and 6A-6B-2, by an electronic device that can include an IC that includes a computing device controlling a piezo-electric device, including, but not limited to, the piezo-electric devices 332(1), 332(2), 432, 532(1)-532(7), 632(1)-632(5) in FIGS. 3A-3D, 5A-5B, and 6A-6B-2, to pump heated air heated by heat generated from an IC out of the internal chamber to dissipate the air from the head-mounted electronic device.

In this regard, the process 800 in FIG. 8 will be discussed in reference to the electronic glasses 302 in FIGS. 3A-3D, but note that the process 800 could also be employed in the other head-mounted electronic devices disclosed herein. In this regard, a first step in the process 800 includes operating the IC 324(1), 324(2) such that the IC 324(1), 324(2) generates heat in the internal chamber 320(1), 320(2) to heat air 334(1), 344(2) in the internal chamber 320(1), 320(2) (block 802 in FIG. 8). A next step in the process 800 includes generating electrical signals 408 to the piezo-electric device 332(1), 332(2) to cause the piezo-electric device 332(1), 332(2) to dissipate the heated air 334(1), 344(2) in the internal chamber 320(1), 320(2) to the outlet 338(1), 338(2) (block 804 in FIG. 8).

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A head-mounted electronic device, comprising:
   a body comprising a first internal chamber;
   a first integrated circuit (IC) integrated into the body and in fluid communication with the first internal chamber; and
   a first piezo-electric device comprising a first inlet in fluid communication with the first internal chamber, and a first outlet;
   wherein:
   the first IC is configured to generate heat to heat air in the first internal chamber; and
   the first piezo-electric device is configured to dissipate the air in the first internal chamber to the first outlet.
2. The head-mounted electronic device of clause 1, wherein the body further comprises a second internal chamber, and further comprising:
   a second piezo-electric device comprising a second inlet in fluid communication with the second internal chamber, and a second outlet;
   wherein the second piezo-electric device is configured to dissipate air in the second internal chamber to the second outlet.
3. The head-mounted electronic device of clause 1, further comprising a second piezo-electric device comprising a second inlet in fluid communication with the first internal chamber, and a second outlet;
   wherein the second piezo-electric device is configured to dissipate air in the first internal chamber to the second outlet.
4. The head-mounted electronic device of any of clauses 1-3, further comprising an air intake in the body;
   wherein the first piezo-electric device is configured to draw in air from outside of the head-mounted electronic device from the air intake into the first internal chamber.
5. The head-mounted electronic device of any of clauses 1-4, further comprising an external surface; and
   wherein the first outlet is coupled to the external surface of the head-mounted electronic device.
6. The head-mounted electronic device of any of clauses 1-5, wherein the first piezo-electric device comprises:
   a housing, wherein the first outlet is disposed through the housing; and
   a piezo-electric element in the housing;
   wherein the piezo-electric element is configured to vibrate in response to an electrical signal to create a pressure differential between the first inlet and the first outlet to pump air in the first internal chamber to the first outlet.
7. The head-mounted electronic device of clause 6, wherein:
   the first piezo-electric device comprises a pump chamber adjacent to the first outlet;
   the piezo-electric element is adjacent to the pump chamber and is in contact with the pump chamber; and
   the piezo-electric element is configured to vibrate in response to the electrical signal to vibrate the pump chamber to create the pressure differential between the first inlet and the first outlet to pump the air in the first internal chamber to the first outlet.
8. The head-mounted electronic device of clause 7, wherein the pump chamber comprises a closed flexible membrane.
9. The head-mounted electronic device of any of clauses 1-8, wherein the body comprises electronic glasses, comprising:
   a frame, comprising:
   a bridge;
   a first lens holder on a first side of the bridge; and
   a second lens holder on a second side of the bridge opposite the first side;
   a first arm coupled to the frame on a third side of the first lens holder; and
   a second arm coupled to the frame on a fourth side of the second lens holder opposite the third side.
10. The head-mounted electronic device of clause 9, wherein the electronic glasses further comprise a first hinge coupling the first arm to the frame and an air intake in the first hinge;
    wherein the first piezo-electric device is configured to draw in air from outside of the head-mounted electronic device from the air intake into the first internal chamber.
11. The head-mounted electronic device of clause 9 or 10, wherein the first arm comprises the first internal chamber.
12. The head-mounted electronic device of clause 11, wherein the first IC is integrated inside the first arm.
13. The head-mounted electronic device of clause 11, wherein the first IC is integrated in the bridge, and the bridge is in fluid contact with the first internal chamber.
14. The head-mounted electronic device of clause 9 or 12, wherein the bridge comprises the first internal chamber.
15. The head-mounted electronic device of clause 14, wherein the first IC is integrated in the bridge.
16. The head-mounted electronic device of clause 14 or 15, wherein the first IC is integrated in the first arm, and the first arm is in fluid contact with the first internal chamber.
17. The head-mounted electronic device of any of clauses 1-16, wherein the first IC comprises a computing device.
18. The head-mounted electronic device of any of clauses 1-17 integrated into a device selected from the group consisting of: electronic glasses; extended reality (XR) glasses; a head-mounted display device; an electronic watch; a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

19. A method of dissipating heat from a head-mounted electronic device, the head-mounted electronic device comprising:
   a body comprising an internal chamber;
   an integrated circuit (IC) integrated into the body and in fluid communication with the internal chamber; and a piezo-electric device comprising an inlet in fluid communication with the internal chamber, and an outlet;
   a temperature sensor coupled to the head-mounted electronic device; and
   an electronic control circuit electrically coupled to the temperature sensor and the piezo-electric device;
   the method comprising the electronic control circuit:
      operating the IC such that the IC generates heat in the internal chamber to heat air in the internal chamber; and
      generating electrical signals to the piezo-electric device to cause the piezo-electric device to dissipate the heated air in the internal chamber to the outlet.

20. The method of clause 19, wherein the body further comprises an air intake;
   wherein generating the electrical signals comprises generating the electrical signals to the piezo-electric device to cause the piezo-electric device to draw in air from outside of the head-mounted electronic device from the air intake into the internal chamber and to dissipate the heated air in the internal chamber to the outlet.

21. The method of clause 20, wherein the piezo-electric device comprises:
   a housing, wherein the outlet is disposed through the housing; and
   a piezo-electric element in the housing;
   wherein generating the electrical signals comprises generating the electrical signals to the piezo-electric element to cause the piezo-electric element to vibrate to create a pressure differential between the inlet and the outlet to pump air in the internal chamber to the outlet.

22. The method of clause 21, wherein:
   the piezo-electric device comprises a pump chamber adjacent to the outlet; and
   the piezo-electric element is adjacent to the pump chamber and is in contact with the pump chamber;
   wherein generating the electrical signals comprises generating the electrical signals to the piezo-electric element to cause the piezo-electric element to vibrate the pump chamber to create the pressure differential between the inlet and the outlet to pump air in the internal chamber to the outlet.

23. The method of any of clauses 19-22, wherein the body comprises electronic glasses, comprising:
   a frame, comprising:
      a bridge;
      a first lens holder on a first side of the bridge; and
      a second lens holder on a second side of the bridge opposite the first side;
      a first arm coupled to the frame on a third side of the first lens holder; and
      a second arm coupled to the frame on a fourth side of the second lens holder opposite the third side.

24. The method of clause 23, wherein the electronic glasses further comprise a first hinge coupling the first arm to the frame and an air intake in the first hinge;
   wherein generating the electrical signals comprises generating the electrical signals to the piezo-electric device to cause the piezo-electric device to draw in air from outside of the head-mounted electronic device from the air intake into the internal chamber and to dissipate the heated air in the internal chamber to the outlet.

What is claimed is:

1. A head-mounted electronic device, comprising:
   a body comprising a first internal chamber;
   a first integrated circuit (IC) integrated into the body and in fluid communication with the first internal chamber; and
   a first piezo-electric device comprising a first inlet in fluid communication with the first internal chamber, and a first outlet;
   wherein:
      the first IC is configured to generate heat to heat air in the first internal chamber; and
      the first piezo-electric device is configured to dissipate the air in the first internal chamber to the first outlet; and
   further comprising an external surface; and
      wherein the first outlet is coupled to the external surface of the head-mounted electronic device.

2. The head-mounted electronic device of claim 1, wherein the body further comprises a second internal chamber, and further comprising:
   a second piezo-electric device comprising a second inlet in fluid communication with the second internal chamber, and a second outlet;
   wherein the second piezo-electric device is configured to dissipate air in the second internal chamber to the second outlet.

3. The head-mounted electronic device of claim 1, further comprising a second piezo-electric device comprising a second inlet in fluid communication with the first internal chamber, and a second outlet;
   wherein the second piezo-electric device is configured to dissipate air in the first internal chamber to the second outlet.

4. The head-mounted electronic device of claim 1, further comprising an air intake in the body;
   wherein the first piezo-electric device is configured to draw in air from outside of the head-mounted electronic device from the air intake into the first internal chamber.

5. The head-mounted electronic device of claim 1, wherein the first piezo-electric device comprises:
   a housing, wherein the first outlet is disposed through the housing; and
   a piezo-electric element in the housing;
   wherein the piezo-electric element is configured to vibrate in response to an electrical signal to create a pressure differential between the first inlet and the first outlet to pump air in the first internal chamber to the first outlet.

6. The head-mounted electronic device of claim 5, wherein:
   the first piezo-electric device comprises a pump chamber adjacent to the first outlet;
   the piezo-electric element is adjacent to the pump chamber and is in contact with the pump chamber; and
   the piezo-electric element is configured to vibrate in response to the electrical signal to vibrate the pump chamber to create the pressure differential between the first inlet and the first outlet to pump the air in the first internal chamber to the first outlet.

7. The head-mounted electronic device of claim 6, wherein the pump chamber comprises a closed flexible membrane.

8. The head-mounted electronic device of claim 1, wherein the body comprises electronic glasses, comprising:
    a frame, comprising:
        a bridge;
        a first lens holder on a first side of the bridge; and
        a second lens holder on a second side of the bridge opposite the first side;
    a first arm coupled to the frame on a third side of the first lens holder; and
    a second arm coupled to the frame on a fourth side of the second lens holder opposite the third side.

9. The head-mounted electronic device of claim 8, wherein the electronic glasses further comprise a first hinge coupling the first arm to the frame and an air intake in the first hinge;
    wherein the first piezo-electric device is configured to draw in air from outside of the head-mounted electronic device from the air intake into the first internal chamber.

10. The head-mounted electronic device of claim 8, wherein the first arm comprises the first internal chamber.

11. The head-mounted electronic device of claim 10, wherein the first IC is integrated inside the first arm.

12. The head-mounted electronic device of claim 10, wherein the first IC is integrated in the bridge, and the bridge is in fluid contact with the first internal chamber.

13. The head-mounted electronic device of claim 8, wherein the bridge comprises the first internal chamber.

14. The head-mounted electronic device of claim 13, wherein the first IC is integrated in the bridge.

15. The head-mounted electronic device of claim 13, wherein the first IC is integrated in the first arm, and the first arm is in fluid contact with the first internal chamber.

16. The head-mounted electronic device of claim 1, wherein the first IC comprises a computing device.

17. The head-mounted electronic device of claim 1 integrated into a device selected from the group consisting of: electronic glasses; extended reality (XR) glasses; a head-mounted display device; an electronic watch; a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; and a vehicle component.

18. A method of dissipating heat from a head-mounted electronic device, the head-mounted electronic device comprising:
    a body comprising an internal chamber;
    an integrated circuit (IC) integrated into the body and in fluid communication with the internal chamber; and
    a piezo-electric device comprising an inlet in fluid communication with the internal chamber, and an outlet;
    a temperature sensor coupled to the head-mounted electronic device; and
    an electronic control circuit electrically coupled to the temperature sensor and the piezo-electric device;
    the method comprising the electronic control circuit:
        operating the IC such that the IC generates heat in the internal chamber to heat air in the internal chamber; and
        generating electrical signals to the piezo-electric device to cause the piezo-electric device to dissipate the heated air in the internal chamber to the outlet.

19. The method of claim 18, wherein the body further comprises an air intake;
    wherein generating the electrical signals comprises generating the electrical signals to the piezo-electric device to cause the piezo-electric device to draw in air from outside of the head-mounted electronic device from the air intake into the internal chamber and to dissipate the heated air in the internal chamber to the outlet.

20. The method of claim 19, wherein the piezo-electric device comprises:
    a housing, wherein the outlet is disposed through the housing; and
    a piezo-electric element in the housing;
    wherein generating the electrical signals comprises generating the electrical signals to the piezo-electric element to cause the piezo-electric element to vibrate to create a pressure differential between the inlet and the outlet to pump air in the internal chamber to the outlet.

21. The method of claim 20, wherein:
    the piezo-electric device comprises a pump chamber adjacent to the outlet; and
    the piezo-electric element is adjacent to the pump chamber and is in contact with the pump chamber;
    wherein generating the electrical signals comprises generating the electrical signals to the piezo-electric element to cause the piezo-electric element to vibrate the pump chamber to create the pressure differential between the inlet and the outlet to pump air in the internal chamber to the outlet.

22. The method of claim 18, wherein the body comprises electronic glasses, comprising:
    a frame, comprising:
        a bridge;
        a first lens holder on a first side of the bridge; and
        a second lens holder on a second side of the bridge opposite the first side;
    a first arm coupled to the frame on a third side of the first lens holder; and
    a second arm coupled to the frame on a fourth side of the second lens holder opposite the third side.

23. The method of claim 22, wherein the electronic glasses further comprise a first hinge coupling the first arm to the frame and an air intake in the first hinge;
    wherein generating the electrical signals comprises generating the electrical signals to the piezo-electric device to cause the piezo-electric device to draw in air from outside of the head-mounted electronic device from the air intake into the internal chamber and to dissipate the heated air in the internal chamber to the outlet.

24. A head-mounted electronic device, comprising:
    a body comprising a first internal chamber;
    a first integrated circuit (IC) integrated into the body and in fluid communication with the first internal chamber; and a first piezo-electric device comprising a first inlet in fluid communication with the first internal chamber, and a first outlet;

wherein:

the first IC is configured to generate heat to heat air in the first internal chamber; and the first piezo-electric device is configured to dissipate the air in the first internal chamber to the first outlet; and further comprising an air intake in the body;

wherein the first piezo-electric device is configured to draw in air from outside of the head-mounted electronic device from the air intake into the first internal chamber.

25. The head-mounted electronic device of claim 24, wherein the first piezo-electric device comprises:

a housing, wherein the first outlet is disposed through the housing; and a piezo-electric element in the housing;

wherein the piezo-electric element is configured to vibrate in response to an electrical signal to create a pressure differential between the first inlet and the first outlet to pump air in the first internal chamber to the first outlet.

26. The head-mounted electronic device of claim 24, wherein the body comprises electronic glasses, comprising:

a frame, comprising:

a bridge;

a first lens holder on a first side of the bridge; and a second lens holder on a second side of the bridge opposite the first side;

a first arm coupled to the frame on a third side of the first lens holder; and a second arm coupled to the frame on a fourth side of the second lens holder opposite the third side.

27. A head-mounted electronic device, comprising:

a body comprising a first internal chamber;

a first integrated circuit (IC) integrated into the body and in fluid communication with the first internal chamber; and a first piezo-electric device comprising a first inlet in fluid communication with the first internal chamber, and a first outlet;

wherein:

the first IC is configured to generate heat to heat air in the first internal chamber; and the first piezo-electric device is configured to dissipate the air in the first internal chamber to the first outlet; and wherein the body comprises electronic glasses, comprising:

a frame, comprising:

a bridge;

a first lens holder on a first side of the bridge; and a second lens holder on a second side of the bridge opposite the first side;

a first arm coupled to the frame on a third side of the first lens holder; and a second arm coupled to the frame on a fourth side of the second lens holder opposite the third side.

\* \* \* \* \*